United States Patent
Zahradnik

[15] 3,697,009
[45] Oct. 10, 1972

[54] FILM CARTRIDGE FOR ENDLESS FILM

[72] Inventor: George J. Zahradnik, Wheaton, Ill.

[73] Assignee: Elco Corporation, Jenkintown, Pa.

[22] Filed: April 16, 1970

[21] Appl. No.: 29,147

[52] U.S. Cl. ............................................. 242/55.19
[51] Int. Cl. ............................................. B65h 17/48
[58] Field of Search ........ 242/55.19, 55.19 A; 352/78, 352/126, 128

[56] References Cited

UNITED STATES PATENTS

| | | | |
|---|---|---|---|
| 3,514,195 | 5/1970 | Nemeth | 352/72 |
| 3,295,782 | 1/1967 | Stark et al | 242/55.19 A |

FOREIGN PATENTS OR APPLICATIONS

| | | | |
|---|---|---|---|
| 1,001,967 | 8/1965 | Great Britain | 242/55.19 A |

Primary Examiner—Stanley N. Gilreath
Assistant Examiner—Gregory A. Walters
Attorney—D. R. Pressman

[57] ABSTRACT

A film cartridge designed to carry an endless roll of film having a rotatably-mounted drive member with a central hub portion and a flange portion. The spiral roll portion of the endless film is disposed about the central hub portion and is loosely contained between the flange portion and a support surface perpendicular to the rotational axis of the drive member. The inner end of the spiral roll extends as a single loop upwardly and forwardly through a film guide passageway to the front wall of the cartridge, where there are openings provided in the film cartridge housing to receive the various movie projector operating components before returning to the outer convolution of the spiral roll.

The drive member has a pair of diametrically-opposed friction pads disposed on the innermost edge of the hub portion to impart a momentary increase in the frictional force applied to the innermost convolutions of the spiral roll during each revolution of the disc. To assist the spiral roll in moving its inner convolutions towards the hub portion, the space in between the flange portion surface and the support surface increases in a radial inward direction. The inner convolution is urged positively away from the disc by employing an annular step formed around the innermost end of the hub portion. The inner end of the spiral roll is pushed off the hub and towards the film gate by driving the disc at a speed greater than can be accommodated by the claw drive mechanism of the movie projector so that a compensated loop is formed in the film guide passageway to provide a supply of film for the claw drive mechanism used to advance the film frame by frame through the film gate.

12 Claims, 12 Drawing Figures

Inventor:—
George J. Zahradnik,
By Johnson, Dienner, Emrich
Verbeck & Wagner
Attys.

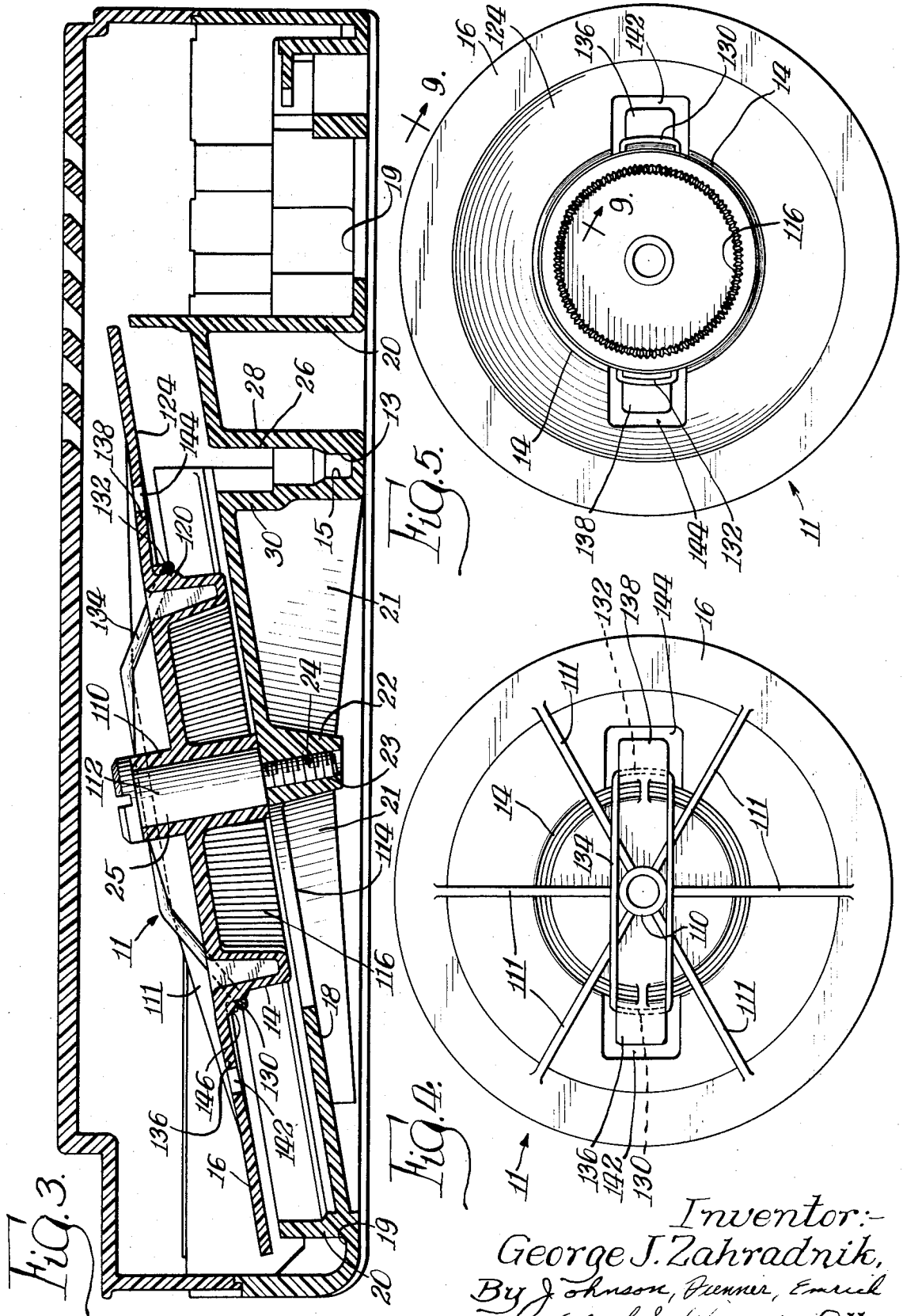

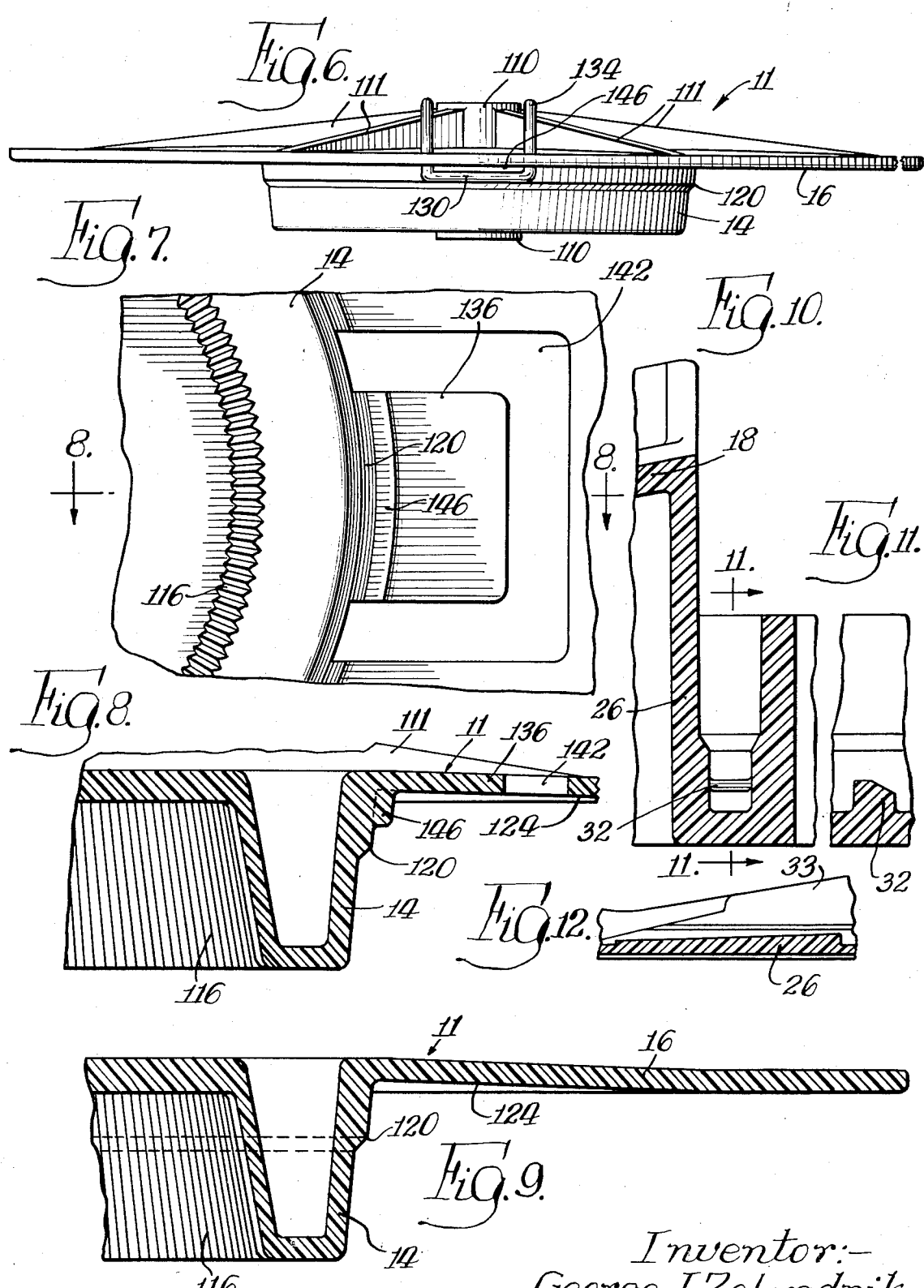

FILM CARTRIDGE FOR ENDLESS FILM

BACKGROUND OF THE INVENTION

This invention relates to improvements in a film cartridge construction, one exemplary structure being disclosed in a co-pending patent application Ser. No. 722,646 of Otto R. Nemeth, entitled "Endless Film Loop Drive System", now U.S. Pat. No. 3,514,195, and assigned to the same assignee as this invention. In the Nemeth patent application, a film drive system is disclosed for feeding the innermost convolution of a spiral roll of film towards the film gate. This drive system operates on the principle of pushing the film towards the film gate rather than the conventional pulling of the film off the spiral roll. The spiral roll of film is driven by a drive member having a flange portion and central hub portion about which the spiral roll is disposed. In the exemplary embodiment thereshown, the drive member is rotated at a constant speed to frictionally engage and drive the edges of the spiral roll such that the inner end of the spiral roll is pushed out of the plane of the spiral and through a film guide passageway towards the film gate of a movie projector. The speed at which the drive member is rotated is selected so that the film is fed at a faster rate than can be accommodated by the claw drive mechanism of the movie projector. As a result, the film in the film guide passageway will periodically buckle forming a compensating loop to produce a back friction force greater than the forward friction force exerted on the edges of the spiral roll by the drive member and thereby cause the spiral roll to slip relative to the rotating drive member until the buckling of the film is terminated upon the advancing of the film through the film gate by the claw drive mechanism.

In order to provide the proper forward speed rate in the Nemeth device, the flange and hub portions of the exemplary drive member are constructed of material having a suitable co-efficient of friction. Accordingly, the necessary compensating loop is formed to effect pushing, instead of pulling, of the film from the spiral roll.

In the above-mentioned Nemeth application, the spiral roll is formed between a support surface and the flange portion, which is generally parallel to the support surface. Understandably, the space must be slightly wider than the width of the film to provide tolerance for radial movement of the film. However, because the cartridge is often used with the spiral roll of film oriented in a generally vertical plane, the film has less encouragement of coiling with the edges flat or aligned evenly. Indeed, the edges tend to become staggered so that the coiled film has some edges on one side contacting the support surface and other edges on the opposite side contacting the flange portion surface. The result is that as the film is payed out and a generally radial movement of the film toward the pay out station occurs, the film can wedge and momentarily disrupt the feeding of the film and prevent the necessary compensating loop from being formed.

Another consideration in designing the drive member to operate in accordance with the principles disclosed in the Nemeth application, is to provide a means for enabling the inner end of the spiral loop to pass out of the plane of the spiral roll and into the film guide passageway.

Accordingly, one object of this invention is to provide a film drive member for feeding the inner end of a spiral roll through a film guide passageway towards the film gate, having a hub portion about which the spiral roll is disposed, which drive member engages and frictionally turns the spiral roll at a feed rate greater than can be accommodated by the claw drive mechanism of the movie projector, where the hub portion includes at least one friction pad to impart a momentary increase in the frictional driving force applied by the drive member to the spiral roll.

Another object of this invention is to provide a film drive system employing a drive member with flange and hub portions for frictionally engaging and driving a spiral roll of film through a film guide passageway towards a film gate, where the spacing between the rotating flange surface and a supporting surface for containing the spiral roll increases in a radially inward direction to prevent the interlocking of adjacent turns on the spiral roll.

SUMMARY OF THE INVENTION

This invention relates to an endless film cartridge in which the film is arranged as a spiral roll portion consisting of a large number of convolutions and an exhibition portion extending as a single loop between the inner and outer ends of the spiral roll portion. The film cartridge has a rotatably-mounted drive member with a flange portion and central hub portion about which the spiral roll of film is disposed. A support surface, which is generally perpendicular to the axis of the drive member and spaced from the flange portion by a distance slightly greater than the width of the film, contains the spiral roll and permits the convolutions of the spiral roll to be turned by the drive member in a laterally free-floating relationship.

In the exemplary embodiment the inner end of the spiral roll is fed off the outer end of the hub portion and out of the plane of the drive member into a film guide passageway that directs the film towards a film gate. The walls along a portion of the film guide passageway are spaced apart by a sufficient distance to permit the film to be buckled.

To prevent the adjacent turns of the spiral roll from becoming interlocked as the inner convolutions of film move toward the hub portion, the distance between the support surface and the flange portion gradually increase inwardly by recessing the flange portion at its inner end. The inner convolution of the spiral roll is urged to move away from the flange portion by an annular step provided at the intersection of the flange portion and disc portion.

The drive member is driven at a constant speed and causes the flange and hub portions to frictionally engage the edges on one side of the spiral roll to feed the inner end of the spiral roll off the hub portion and through the film guide passageway towards the film gate. To insure that there is always a sufficient supply of film for the intermittent claw drive mechanism, the rotational speed of the drive member is selected such that the film is fed at a greater rate than can be accommodated by the claw drive mechanism, causing the film in the film guide passageway to buckle and form a compensating loop. The buckling of the film creates a back friction on the spiral roll resulting in the slipping of the spiral roll relative to the drive member until the back friction is removed. To assist in driving the spiral roll of film to deliver the film through the passageway at the desired rate of feed, the drive member has a pair of friction pads mounted at diametrically opposite positions on the inner end of the hub portion, which imparts a momentary large frictional driving force to the spiral roll at a rate of twice per revolution.

DESCRIPTION OF DRAWING

For a better understanding of the present invention, reference may be had to the accompanying drawings in which:

FIG. 3 is a sectional view taken through the center line of the drive member used in the film cartridge;

FIG. 4 is a front elevational view illustrating the driving member used in the cartridge of FIG. 1;

FIG. 5 is a rear elevational view of FIG. 4;

FIG. 6 is a plan view of FIG. 4;

FIG. 7 is an enlarged partial view of FIG. 5;

FIG. 8 is a sectional view taken along the line 8—8 of FIG. 7;

FIG. 9 is a sectional view taken along the line 9—9 of FIG. 5;

FIG. 10 is a cross sectional view taken along the line 10—10 of FIG. 2;

FIG. 11 is a cross-sectional view taken along the line 11—11 of FIG. 10; and

FIG. 12 is a cross-sectional view taken along the line 12—12 of FIG. 2.

DESCRIPTION OF PREFERRED EMBODIMENT

Figure 1:
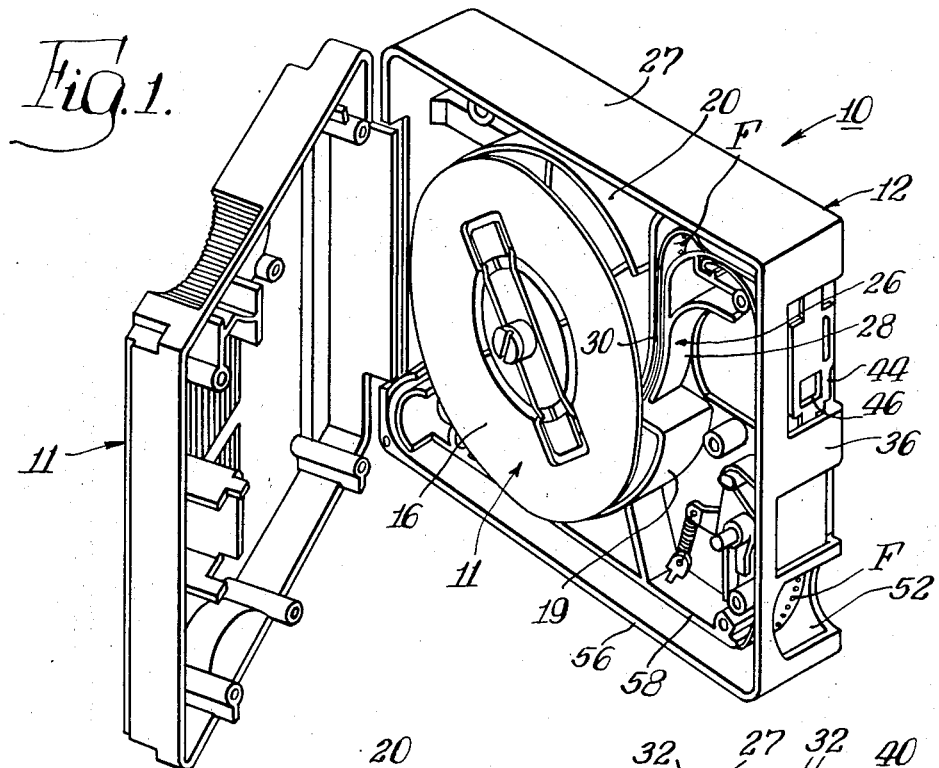
FIG. 1 is a perspective view of the endless film cartridge incorporating the features and principles of this invention.

Referring to FIG. 1, there is shown a film cartridge 10 having a cover 11 shown in a removed position to expose the interior of the film cartridge. All of the operating components of the film cartridge 10 are mounted in the pan-shaped housing 12, depicted on the right side in FIG. 1.

As best shown in FIG. 3, a drive member 11, rotatably mounted in the pan-shaped housing, has a hub portion 14 and a flange portion 16. A spiral roll of film disposed about the hub portion 14 is contained between the flange portion 16 and a supporting surface 18.

Support surface 18 having a generally circular configuration is integrally connected to the rear wall 19 of pan-shaped housing 12 by means of arcuate wall segments 20 and a number of ribs 21, extending radially between its center portion 22 and the arcuate wall segments 20. The center portion 22 has a threaded opening 23 perpendicular to support surface 18 for receiving the threaded end 24 (FIG. 3) of shaft 25 about which drive member 11 rotates.

For receiving payed out film, in the present instance from an inner circumferential portion of the spiral roll, a pay out station is provided, herein shown as a narrow channel 26. The latter is exemplarily provided between the film support surface 18 and the rear wall 19 of the cartridge 10 of the pan-shaped housing 12. The channel 26 guides the inner end of the spiral roll of film F (FIG. 1) out of the plane of the spiral roll upwardly toward the top 27 of the pan-shaped housing 12. The guide channel 26 is formed by two spaced walls or ribs 28 and 30 which projects substantially perpendicular from the rear wall 19 in the space (FIG. 3) between the rear wall 19 and the support surface 18. As shown in FIG. 3, the forward end of the film support surface 18 is spaced from the rear wall 19 of the pan-shaped housing 12 by a distance greater than the width of the film to permit the channel 26 to be formed between the forward portion of the film support surface 18 and the rear wall 19.

In order to avoid any rubbing of the film surface, especially the emulsion or image surface of the film, each of the walls 28 and 30 of the guide channel 26 is provided with inwardly projecting wall surfaces 13 and 15 at the bottom of the channel 26 which contact the perforated edge of the film in such manner as to prevent the film surfaces from rubbing along the wall surfaces 28 and 30. Pads 32 and 62 at bottom of channels 26 and 54 are provided to reduce the frictional engagement between the film edge and the bottom of the channels. Similarly, the film is fed into the entrance of channel 26 along slanting skid surface 33 (FIG. 12) which only engages one edge of the film.

The channel 26 directs the film upwardly towards and across the top wall 27 of the cartridge, where the film passes over guide 38. The film is then supported between the exit end of the guide channel 24 and the guide 38. The horizontal portion 34 of film guide channel 26 is substantially wider than its vertical portion 35, to provide space for the compensating movement of film, as will be discussed hereinafter.

At the top of the front wall 36 there is a pressure plate 44 (FIG. 1) for maintaining the film in a projection position and having a projection aperture 46. This pressure plate may be of any suitable form and is urged toward the front wall of the cartridge by a spring 50. Various suitable forms of pressure plates and spring mountings are well known in the art.

Below the projection aperture 46 the film passes downwardly adjacent the front wall 36 and near the bottom of the wall 36, the film engages a constant speed sprocket which is received through arcuate opening 52. For returning film to the spiral roll, in the present instance an outer circumferential portion of the spiral roll, the film F leaves the drive sprocket opening 52 and enters a guide channel 54 formed by the bottom wall 56 of the pan-shaped housing 12 and a wall 58 which is parallel to and spaced from the bottom wall. Adjacent the rear wall 60, the guide channel 54 turns upwardly and forwardly, as indicated at 59, to feed the loop of film unto the outer convolution of the storage roll. Since it is undesirable that there be any buckling of the film in the guide channel 54, the channel is made as narrow as possible within convenient manufacturing limits. Like the channel 26, the walls of the guide channel 54 are provided with inwardly extending ribs 62 to engage the edge portions of the film.

Between the projection aperture 46 and the drive sprocket opening 52 there is a loop forming device comprising a bell crank lever 72 pivotally secured to the rear wall 19 at 74, which carries a stud 76 for engaging the film. When the cartridge 10 is placed in operating position in the side wall of a movie projector, a stud 91 extending from the side wall of the projector projects through an opening 90 (FIG. 2) in the rear wall 19 of the housing 12 and engages the arm 92 of the bell crank lever 72 turning the lever in a clockwise direction to release the stud 76 from the film and forming a free unsupported compensating loop between the projection gate and continuous feed sprocket. The sound unit, which is not shown, may be of any desired construction and is normally positioned directly above feed sprocket opening 52.

An elliptical opening 96 is provided adjacent the pressure plate 44 to receive a lamp housing when the projector cartridge 10 is inserted into the projector receptacle to provide a light source.

For a more complete description of the cooperation between the cartridge 10 and the movie projector, reference is made to a co-pending application of Otto R. Nemeth, Ser. No. 722,646, now U.S. Pat. No. 3,514,195, which is assigned to the same assignee as this invention.

Referring to FIGS. 4 – 9 there is shown the drive member 11 which incorporates the principles of this invention and consists of a flange portion 16 and central hub portion 14. The flange portion 16 and hub portion 14 are joined together as a molded integral unit which are rigidly supported by a plurality of radial ribs 111 extending from the center of drive member 11. A cylindrical sleeve 110 is integrally formed in the center or axis of the hub portion 14 extending in a generally perpendicular direction. The shaft 25 in the form of a bolt 112, as shown in FIG. 3, having threaded portion 24 at its outer end is inserted through the cylindrical sleeve 110 to rotatably mount the drive member 11 in the threaded hole 23 of the pan-shaped housing 12 of the cartridge 10 (depicted in FIG. 3). A continuous series of serrated teeth 116 are formed in an annular ring around the inner surface of the hub portion 14 and are engaged by a flexible rubber drive shaft member extending from the side wall of the projector when the cartridge 10 is inserted in the side wall of the projector to project through oblong opening 114 in back wall 19 (FIG. 2).

Figure 2:
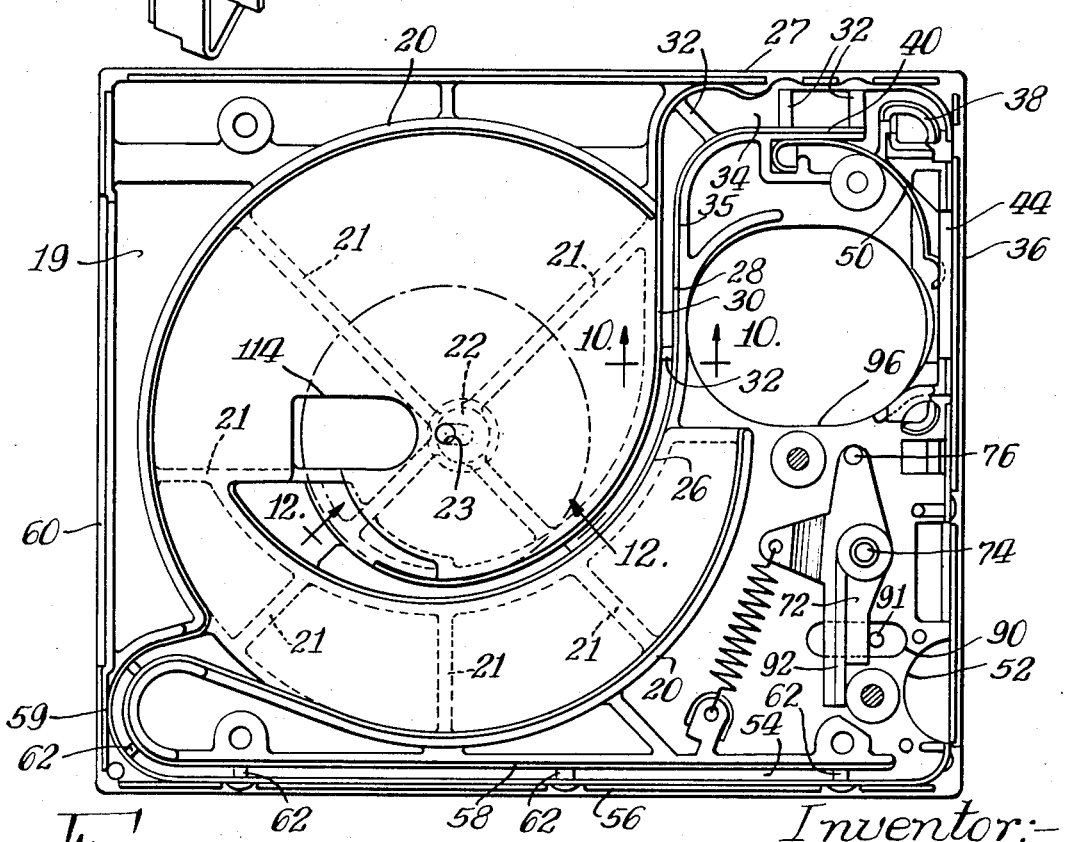
FIG. 2 is a front elevational view depicting the body portion of preferred form of the cartridge embodying the present invention.

Referring to FIGS. 1 through 3, a spiral roll of film disposed about the hub portion 14 of the drive member 11 and contained between the supporting surface 18 and the flange portion 16 has its inner end fed into the lower end of the film guide passageway 26 and transverses across the plane of supporting surface 18. The drive hub portion 14 is tapered at a slight angle toward the support surface 18 so that the inner convolutions are engaged only along the film edge and not across the film surface. To positively guide the inner convolution away from the flange portion 16, an annular step 120 is provided at the intersection of the drive hub 14 with the flange 16. This annular inner step 120 is clearly depicted in the enlarged views of FIGS. 8 and 9.

In order to permit the roll of film F to be disposed about the hub portion 14 of the drive member 11, it is necessary that the flange portion 16 be separated from the supported surface 18 by a distance slightly greater than the width of the film. In the above-mentioned Nemeth application, it was suggested that the flange portion 16 may be substantially parallel to the support surface 18. In the latter instance the film edges, if not aligned, can maintain a frictional engagement with the flange portion and the support surface so that as the drive member 11 rotates to effect movement of the film towards the pay out station, certain turns or convolutions of the spiral roll can become wedged and cause the feeding of the film into the channel portion 26 to be interrupted. It has been discovered that by forming the flange portion 16 and the support surface 18 so that the distance between the latter gradually increases toward the film pay out station, that any frictional engagement which does occur does not present film movement problems. In the exemplary embodiment of this invention, a diverging spacing is accomplished by recessing the contacting surface 124 (FIG. 9) of the flange portion 16 in a radial direction as it extends towards the hub portion 14. In other words, the contacting surface 124 of the flange portion 16 diverges in a radially inward direction because film is payed out from an inner circumferential convolution adjacent the hub portion 14.

To impart a momentary large frictional driving force to the edges of the inner convolutions of film, the drive member 11 is constructed with two arcuate friction pads 130 and 132 at diametrically opposite positions at the outer surface of the hub portion 14. The friction pads 130 and 132 are formed by stretching a rubber O-ring 134 across the top surface of the drive member 11 and placing the loop ends over the ears 136 and 138, which extend in radially opposite directions and are formed by U-shaped slots 142 and 144, respectively, cut out the flange portion 16. This is, of course, only one way in which the friction pads can be mounted on the drive member 14. Short arcuate segments could, for example, be glued directly to the structure of the drive member 14. Also, if it is found desirable, three or more such arcuate segments could be used with the drive member 14. To make rubbing pads 130, 132 substantially flush with the forward edge of step 120, a pair of arcuate segments 146 (FIG. 8) is integrally provided across the innermost ends of ears 136, 138.

When the cartridge 10 is inserted into an operational position in a movie projector as fully described in the above-identified Nemeth patent application with the plane of the roll of film generally vertically aligned, the drive member 11 is driven at a constant speed, causing the flange 16 and hub portion 14 to frictionally engage the edges on one side of the spiral roll of film to feed the inner circumferential portion of the spiral roll off the hub portion 14 and up through the film guide passageway 26 towards the movie projector film gate. To insure that there is always a sufficient supply of film for the intermittent claw drive mechanism of the movie projector, the film must be fed at a greater rate than can be accommodated by the claw drive mechanism, causing the film in the film guide passageway 26 to buckle and form a compensating loop. It is apparent that upon the buckling of film, the frictional force developed between the edges of the film spiral roll portion and the drive member 11 must be overcome to enable the spiral roll to slip relative to drive member 11. Thus, the determination of the co-efficient of friction for the drive member 11 is very important for proper operation of the film drive system. Different commercially available plastic materials have been found to be quite satisfactory for this purpose. However, it has been discovered that more latitude can be used in the selection of the material for drive member 11 by using the pair of friction pads 130, 132, whose coefficient of friction is much greater than the drive member 11. The effect of using the pair of pads 130, 132 is to impart a momentary large frictional driving force to the spiral roll at a rate of twice a revolution.

While this invention has been described in connection with a certain specific embodiment thereof, it is to be understood that this is by way of illustration and not by way of limitation; and the scope of this invention is defined solely by the appended claims which should be construed as broadly as the prior art will permit.

I claim as my invention:

1. In a film cartridge for an endless film having a roll portion in the form of a spiral composed of a substantial number of convolutions with respective inner and outer circumferential portions and an exhibition portion being payed out forwardly from said roll in a single loop from one of said roll circumferential portions through a film gate in a motion picture apparatus and returned from the latter to the other of said roll circumferential portions, in combination: a film drive member having a flange portion and a central hub portion about which said roll is adapted to frictionally engage edges of the convolutions of said spiral roll, a support having a surface facing said flange portion adapted to engage the opposite edges of the convolutions of said spiral roll, said flange portion and said support surface separated by a distance that gradually increases in a direction toward the circumferential portion of said spiral roll from which film is payed out, a first guide adapted to cooperate with the circumferential portion of said spiral roll from which film is payed out, a second guide adapted to cooperate with the circumferential portion of said spiral roll to receive the exhibition portion of film passed through the film gate and return it to the spiral roll, and means for rotating said drive member at a speed slightly greater than that necessary to feed the film through the film gate.

2. The combination of claim 1, wherein the surface of the flange portion between said outer periphery and said central hub portion is disposed at a slight diverging angle in a radial direction toward the circumferential portion of said spiral roll from which the film is payed out.

3. In a film cartridge for an endless film having a roll portion in the form of a spiral composed of a substantial number of convolutions and an exhibition portion extending forwardly from said roll portion in a single loop from the innermost convolution through a film gate in a motion picture apparatus to the outermost convolution thereof, in combination: a film drive member having a flange portion and a central hub portion about which said spiral roll is adapted to be disposed, the surface of said flange portion adapted to frictionally engage the edges of the convolutions of said spiral roll and operative to advance the film, a support surface generally perpendicular to the axis of said drive member and engageable with the opposite edges of the convolutions of said spiral roll, said drive member including means for impulsing said film advance by applying a periodic frictional force to the edges of said innermost convolutions to impart at least once each revolution of said flange portion a substantial momentary increase in the driving force applied to said spiral roll, guide means extending from a point adjacent to said hub out of the plane of said spiral roll to guide the inner convolution of the film from said spiral roll through the film gate, return guide means for receiving the exhibition portion of film passed through the film gate from the inner end of said spiral roll to guide the film onto the outer convolution of said spiral roll, and means for rotating said drive member at a speed slightly greater than necessary to feed the film through the film gate.

4. The combination of claim 3, wherein said impulsing means includes a pair of friction pads at diametric opposite positions mounted on said hub portion of said drive member, said friction pads constructed from material having a coefficient of friction substantially greater than the material of said disc.

5. In a film cartridge for an endless film having a roll portion in the form of a spiral composed of a substantial number of convolutions and an exhibition portion extending forwardly from said roll in a single loop from the innermost convolution through a film gate in a motion picture apparatus to the outermost convolution thereof, in combination: a film drive member having a flange portion and a central hub portion about which said roll is adapted to be disposed, the surface of said flange portion adapted to frictionally engage edges of the convolutions of said spiral roll, a support surface facing said flange portion and adapted to engage the opposite edges of the convolutions of said spiral roll, where the distance separating said flange portion and said support surface gradually increases in a radially inward direction between the outer periphery of said flange portion and said hub portion, guide means extending from a point adjacent to said hub portion out of the plane of said spiral roll to guide the inner convolution of the film from said spiral roll through the film gate, return guide means for receiving the exhibition portion of film passed through the film gate from the inner end of said spiral roll to guide the film onto the outer convolution of said spiral roll, and means for rotating said drive member at a speed slightly greater than that necessary to feed the film through the film gate.

6. The combination of claim 5, wherein the surface of the flange portion between said outer periphery and said central hub portion is disposed at a slight diverging angle in a radially inward direction relative to said support surface.

7. In a film cartridge for an endless film having a roll portion in the form of a spiral composed of a substantial number of convolutions and an exhibition portion extending forwardly from said roll in a single loop from the innermost convolution through a film gate in a motion picture apparatus to the outermost convolution thereof, in combination: a film drive member having a flange portion and central hub portion about which said roll is adapted to be disposed and operative to advance the film, said hub portion being slightly tapered outwardly and having an annular step adjacent its innermost end for positively guiding the innermost convolution of film away from said flange portion, a support surface generally perpendicular to the axis of said drive member and adapted to engage with the opposite edges of the convolutions of said spiral roll, guide means extending from a point adjacent to said hub out of the plane of said spiral roll to guide the inner convolution of the film from said spiral roll through the film gate, return guide means for receiving the exhibition portion of film passed through the film gate from the inner end of said spiral to guide the film onto the outer convolution of said spiral roll, and means for rotating said drive member at a speed slightly greater than necessary to feed the film through the film gate.

8. The combination of claim 7, wherein the distance separating said flange portion and said support surface gradually increases in a radially inward direction between the outer periphery of said flange portion and said hub portion.

9. The combination of claim 7, further comprising means for impulsing said film advance by applying a periodic frictional force to the edges of said innermost convolutions to impart at least once each revolution of said flange portion a substantial momentary increase in the driving force applied to said spiral roll.

10. In a film cartridge for an endless film having a roll portion in the form of a spiral composed of a substantial number of convolutions and an exhibition portion extending forwardly from said roll portion in a single loop from the innermost convolution through a film gate in a motion picture apparatus to the outermost convolution thereof, in combination: a film drive member having a flange portion and a central hub portion about which said spiral roll is disposed, the surface of said flange portion adapted to frictionally engage the edges of the convolutions of said spiral roll to advance the film, a support surface facing said flange portion adapted to engage the opposite edges of the convolution of said spiral roll, two cut-outs formed in the surface of said flange portion adjacent to said hub portion to provide a pair of ears at diametric opposite positions, a rubber O-ring stretched over said ears to provide two short arcuate friction pads which are adapted to impulse said film advance by applying a periodic frictional force to the edges of said innermost convolutions of said spiral roll to impart two momentary increases in the driving force applied to said spiral roll, guide means extending from a point adjacent to said hub out of the plane of said spiral roll to guide the inner convolution of the film from said spiral roll through the film gate, return guide means for receiving the exhibition portion of film passed through the film gate to guide the film onto the outer convolution of said spiral roll, and means for rotating said drive member at a speed slightly greater than necessary to feed the film through the film gate.

11. The combination of claim 10, wherein the distance separating said flange portion and said film support gradually increases in a radially inward direction between the outer periphery of said flange portion and said hub portion.

12. The combination of claim 11, wherein said hub portion has an axis and an outer periphery slightly tapered toward said axis and said support surface and has an annular step adjacent said flange portions.

* * * * *